(12) United States Patent
Chon et al.

(10) Patent No.: US 7,271,705 B2
(45) Date of Patent: Sep. 18, 2007

(54) MOBILE COMMUNICATION TERMINAL AND METHOD FOR PROVIDING PROGRESSIVE ALARM FUNCTION

(75) Inventors: Hong-Chun Chon, Uiwang-si (KR); Jae-Byoong Han, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 13 days.

(21) Appl. No.: 10/931,893

(22) Filed: Sep. 1, 2004

(65) Prior Publication Data
US 2005/0104720 A1    May 19, 2005

(30) Foreign Application Priority Data
Nov. 19, 2003 (KR) .................. 10-2003-0082128
Jun. 24, 2004 (KR) .................. 10-2004-0047692

(51) Int. Cl.
*G08B 1/00* (2006.01)
(52) U.S. Cl. .............. 340/309.16; 368/261; 368/262; 368/263; 455/424; 455/425
(58) Field of Classification Search .......... 340/309.16, 340/309.3, 309.7, 309.8, 309.9, 309.1; 368/73, 368/243, 244, 245, 242, 10, 89, 1, 262, 263, 368/261; 455/424, 425
See application file for complete search history.

(56) References Cited

U.S. PATENT DOCUMENTS 5,253,230 A * 10/1993 Kuo .................... 368/263
5,379,273 A * 1/1995 Horinek .................. 368/73
5,442,600 A * 8/1995 Kutosky .................. 368/109
5,559,495 A * 9/1996 Cochran .................. 340/457
5,995,455 A * 11/1999 Kutosky .................. 368/73
6,229,430 B1 * 5/2001 Smith Dewey ........ 340/286.02
6,477,117 B1   11/2002 Narayanaswami et al.
2003/0025592 A1 * 2/2003 Choi et al. ............. 340/309.15
2003/0114189 A1 * 6/2003 Moon ..................... 455/556

FOREIGN PATENT DOCUMENTS

KR    10-2003-0041567    5/2003
WO    WO 01/95660       12/2001

OTHER PUBLICATIONS

Handbook for the Palm V Organizer, 1999, 3COM Corporation.

* cited by examiner

*Primary Examiner*—Jeffery Hofsass
*Assistant Examiner*—Edny Labbees
(74) *Attorney, Agent, or Firm*—The Farrell Law Firm

(57) ABSTRACT

A method for providing a progressive alarm function in a mobile terminal is provided. In an alarm setting mode, an initial alarm time input by the user is set as an alarm time of the terminal and a unit time for changing the alarm time is set. After an alarm is output at the set alarm time, it is checked to determine whether a specific key is pressed within a predetermined time. If the specific key is pressed, the alarm time is extended by the unit time. The progressive alarm function allows the user to optionally control alarm setting of the terminal to continually change the alarm time. The alarm time is not fixed but instead the user can continually extend the alarm time by pressing the specific key without the trouble of performing a number of key operations to change the alarm time in the alarm setting menu.

10 Claims, 9 Drawing Sheets

MOBILE COMMUNICATION TERMINAL AND METHOD FOR PROVIDING PROGRESSIVE ALARM FUNCTION

PRIORITY

This application claims priority to an application entitled "MOBILE COMMUNICATION TERMINAL AND METHOD FOR PROVIDING PROGRESSIVE ALARM FUNCTION", filed in the Korean Intellectual Property Office on Nov. 19, 2003 and assigned Ser. No. 2003-0082128, and an application entitled "MOBILE COMMUNICATION TERMINAL AND METHOD FOR PROVIDING PROGRESSIVE ALARM FUNCTION", filed in the Korean Intellectual Property Office on Jun. 24, 2004 and assigned Ser. No. 2004-0047692, the contents of each of which are incorporated herein by reference.

BACKGROUND OF THE INVENTION

1. Field of the Invention

The present invention relates to a mobile communication terminal, and more particularly to a mobile communication terminal for providing a progressive alarm function and a method for the same, in which an alarm time of the terminal can be continually changed after the alarm time is initially set.

2. Description of the Related Art

Mobile communication terminals include devices such as PDAs or cell phones that provide telephone or data communication services to users so that they can perform mobile telephone communication or exchange data. Mobile communication terminals have permeated every aspect of life and are used by people of all ages. Along with the development of mobile communication technology, mobile communication terminals provide various menus allowing users to set ring style, ring volume, alarm, phone lock, incoming/outgoing call barring, etc. In particular, the users often use the alarm function for schedule management since they always carry the terminals with them.

FIG. 1 is a flow chart showing a conventional method for setting an alarm in a mobile communication terminal. In the conventional method, the alarm rings once a day at an alarm time set by the user.

As shown in FIG. 1, the mobile communication terminal checks whether an alarm setting mode is selected by the user pressing a corresponding key at step S100. Here, the mobile communication terminal waits until the alarm setting mode is selected. If the alarm setting mode is selected, the mobile communication terminal displays a message requesting that the user input an alarm time at step S110.

After the user inputs an alarm time to be set by pressing a corresponding key sequence at step S120, the mobile communication terminal checks whether an OK key is pressed at step S130. If the OK key is not pressed, the mobile communication terminal returns to the above step S120.

If the OK key is pressed at step S130, the mobile communication terminal sets the alarm time as input by the user, and then at step S140 terminates the alarm setting mode (S140).

According to the conventional method, the mobile communication terminal simply outputs the alarm at a specific or fixed time. Therefore, in order to modify the set alarm time, the user must input details for setting a new alarm time by pressing a long key sequence in the alarm setting menu. Thus, although the conventional alarm function serves as a simple alarm clock that outputs an alarm at a fixed time, a user who is not fully awakened by the alarm will often fall back to sleep before completing the input of the long key sequence required to set a new alarm time.

SUMMARY OF THE INVENTION

Therefore, the present invention has been made in view of the above problem, and it is an object of the present invention to provide a method for setting an alarm time in a mobile communication terminal, in which the set alarm time is not fixed but can be continually changed according to user selection.

It is another object of the present invention to provide a mobile communication terminal having a progressive alarm function that allows the user to continually extend and change the alarm time from an initially set alarm time through a simple key operation.

In accordance with one aspect of the present invention, the above and other objects can be accomplished by the provision of a mobile communication terminal that includes a controller for setting an initial alarm time input by a user of the terminal as an alarm time of the terminal, and setting a unit time for changing the alarm time, and then performing a progressive alarm function for continually changing the alarm time from the initial alarm time based on the unit time; a progressive alarm information storage unit for storing information of an initial alarm time set by the controller, an alarm time changed according to selection of a specific key, and a unit time for changing the alarm time; and an alarm output unit for outputting an alarm at an alarm time according to the information stored in the progressive alarm time storage unit.

In accordance with another aspect of the present invention, there is provided a method for providing a progressive alarm function of a mobile communication terminal that includes switching to an alarm setting mode upon request of a user of the terminal; setting an initial alarm time input by the user as an alarm time of the terminal and setting a unit time for changing the alarm time; outputting an alarm at the set alarm time and checking whether a specific key is selected within a predetermined time; and changing the alarm time by adding the unit time to the alarm time in response to the selection of the specific key.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention unclear.

Figure 1:
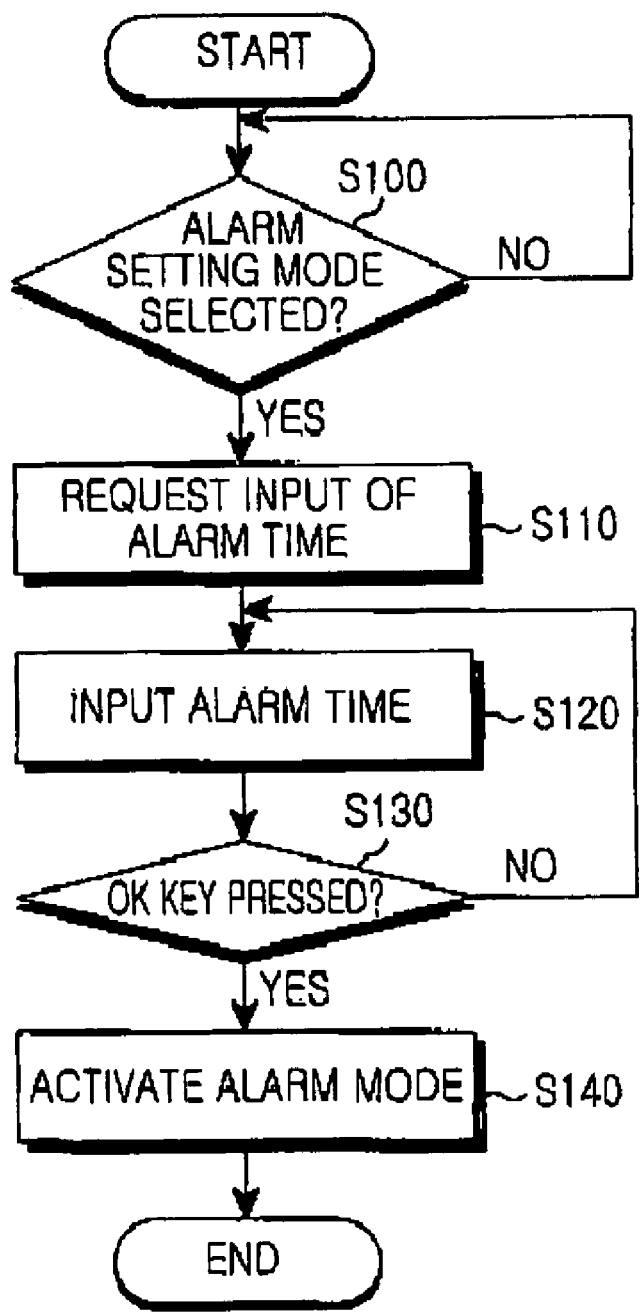
FIG. 1 is a flow chart showing a conventional method for setting an alarm in a mobile communication terminal.
Figure 2:
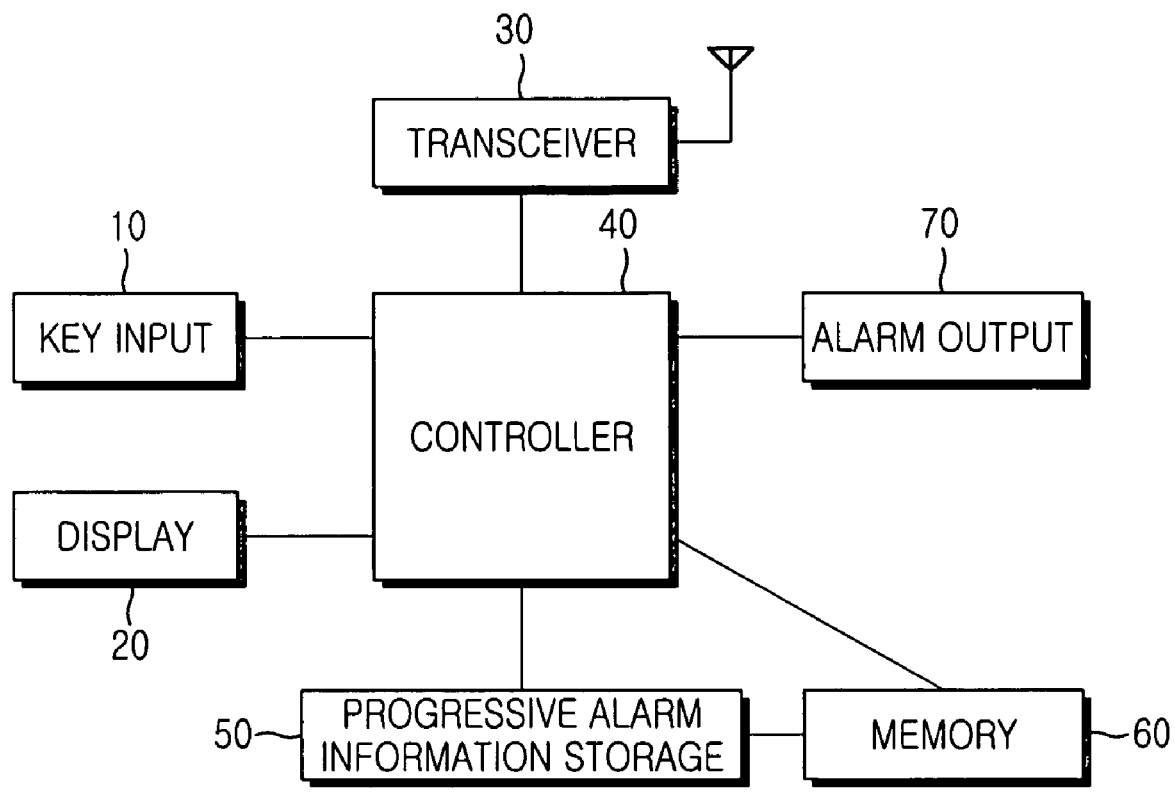
FIG. 2 is a block diagram showing the configuration of a mobile communication terminal according to an embodiment of the present invention.

FIG. 2 is a block diagram showing the configuration of a mobile communication terminal according to an embodiment of the present invention.

The mobile communication terminal includes a key input unit 10, a display unit 20, a transceiver 30, a controller 40, a progressive alarm information storage unit 50, a memory 60 and an alarm output unit 70, as shown in FIG. 2. The key input unit 10 includes various function keys, number keys, special keys and the like, which provides a key input signal corresponding to a key pressed by the user to the controller 40.

The display unit 20 may be a Liquid Crystal Display (LCD) or the like, and outputs various display data generated by the mobile communication terminal. For example, the display unit 20 displays a screen for setting an alarm time and a progressive alarm function and a screen for setting a unit time used for the progressive alarm function in the mobile communication terminal, according to an embodiment of the present invention. The transceiver 30 is responsible for transmitting and receiving audio and control data under the control of the controller 40.

The controller 40 controls the overall operation of the mobile communication terminal according to the embodiment of the present invention. In particular, the controller 40 sets an initial alarm time input by the user as an alarm time of the terminal and sets a unit time for changing the alarm time. At the set initial alarm time, the controller 40 outputs an alarm sound through the alarm output unit 70 and checks whether a specific key for changing the alarm time is pressed within a predetermined time from the set initial alarm time. If the specific key is pressed, the controller 40 changes the alarm time by adding a preset unit time, multiplied by the number of times the specific key is pressed, to the initial alarm time, and outputs a message indicating the changed alarm time. Here, a side key (for example, volume up/down keys) provided on the outside of the mobile communication terminal is preferably set as the specific key.

If a number key is pressed within the predetermined time after the alarm is output, the controller 40 changes the alarm time by adding the preset unit time, multiplied by a number corresponding to the selected number key, to the alarm time, and outputs a message indicating the changed alarm time.

The controller 40 repeats the alarm time change operation until no further specific key input is received within the predetermined time from a new alarm time after the alarm time is changed to the new alarm time. If the specific key for alarm time change is not pressed within the predetermined time from the new alarm time after the alarm time is changed to the new alarm time, the controller 40 resets the changed alarm time to the initial alarm time.

The progressive alarm information storage unit 50 stores information of the initial alarm time set by the controller 40, an alarm time changed as the specific key is pressed, and a unit time for changing the alarm time according to the embodiment of the present invention. The stored unit time is in units of seconds, minutes and hours, as described in detail below with reference to FIG. 3.

The memory 60 stores various information required to control the operation of the mobile communication terminal. At an alarm time according to the information stored in the progressive alarm information storage unit 50, the alarm output unit 70 outputs an alarm under the control of the controller 40.

Figure 3:
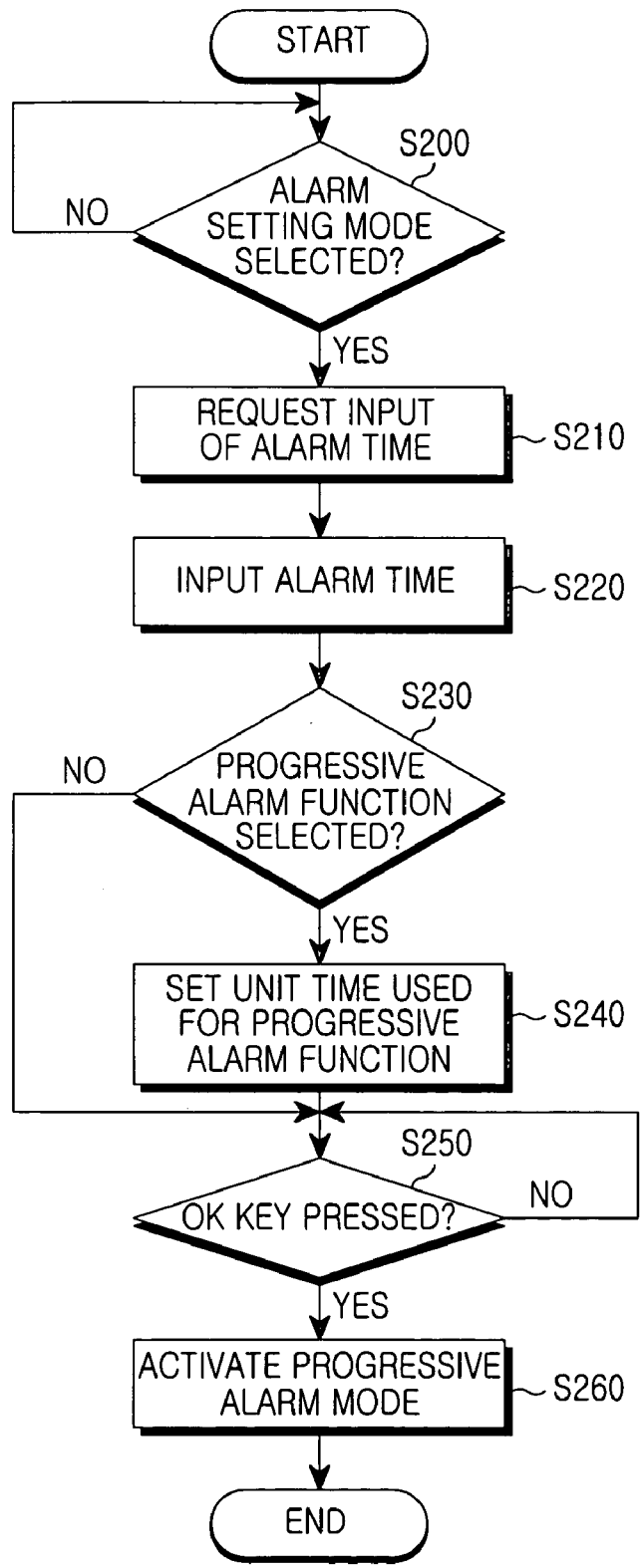
FIG. 3 is a flow chart showing the procedure for setting a progressive alarm in the mobile communication terminal according to an embodiment of the present invention.

FIG. 3 is a flow chart showing the procedure for setting a progressive alarm in the mobile communication terminal according to an embodiment of the present invention.

As shown in FIG. 3, the mobile communication terminal checks whether an alarm setting mode is selected as the user presses a corresponding key at step S200. If the alarm setting mode is selected as the user presses the corresponding key, the mobile communication terminal outputs a message requesting that the user input an alarm time at step S210. The message requesting the alarm time input can be output in the form of text or speech.

If an alarm time to be set is input as the user presses a corresponding key sequence at step S220, is the controller 40 checks whether a progressive alarm function is selected at step S230. If a key for selecting the progressive alarm function is not pressed, the mobile communication terminal moves to step S250 to check whether an OK key is pressed. The progressive alarm function is used to continually change the alarm time from the initially set alarm time.

If the progressive alarm function is selected as the user presses the corresponding key at step S230, the mobile communication terminal operates to set a unit time used for the progressive alarm function at step S240. The unit time is preferably set in units of seconds, minutes or hours. The user can select the unit time via input of any of the three units of time by pressing a corresponding key. The unit time set at step S240 is used in continually changing the alarm time. If the user presses a specific key for setting a progressive alarm time when the progressive alarm mode is active, the mobile communication terminal changes the alarm time by adding the set unit time to the initially set alarm time in response to the pressed the specific key.

At step S250, the mobile communication terminal waits for the user to press the OK key for storing the unit time set at step S240. If the OK key for storing the set unit time is pressed, the mobile communication terminal activates the progressive alarm mode at step S260.

Figure 4A:
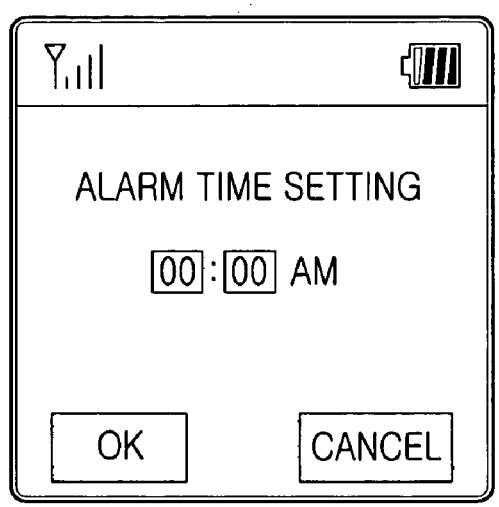
FIGS. 4A and 4B show a screen for setting an alarm time and a screen for setting the progressive alarm function according to an embodiment of the present invention, respectively.
Figure 4B:
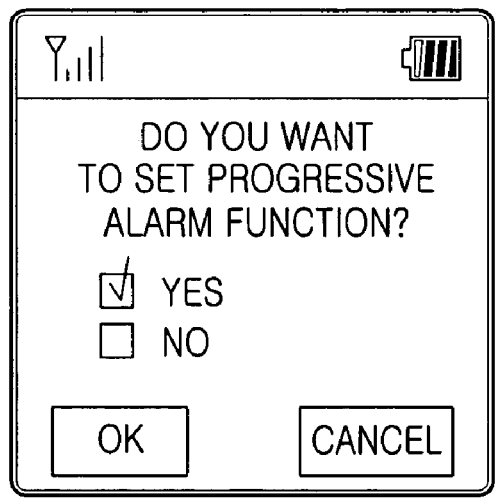

FIGS. 4A and 4B show a screen for setting an alarm setting and a screen for setting of the progressive alarm function according to an embodiment of the present invention, respectively.

If the user selects the alarm time setting menu by pressing a corresponding key, the mobile communication terminal displays the alarm time setting screen as shown in FIG. 4A. If the user presses the OK key after inputting an alarm time to be set by entering corresponding key data as shown on the screen of FIG. 4A, the mobile communication terminal displays the screen for setting the progressive alarm function as shown in FIG. 4B.

A message "Do you want to set progressive alarm function?" and two options "Yes" or "No" for setting or not the progressive alarm function are preferably displayed on the progressive alarm function setting screen of FIG. 4B. If the user of the mobile communication terminal selects the option "Yes" for setting the progressive alarm function as shown in FIG. 4B, the mobile communication terminal displays a screen for setting the unit time as shown in FIG. 5A.

FIGS. 5A to 5F show example screens for setting the unit time used for the progressive alarm function in the mobile communication terminal according to the embodiment of the present invention.

Specifically, FIGS. 5A to 5F show screens for setting the unit time used for the progressive alarm function after the user of the mobile communication terminal sets the initial alarm time to "6:00 AM" in the screen of FIG. 4A and sets the progressive alarm function in the screen of FIG. 4B.

Figure 5A:
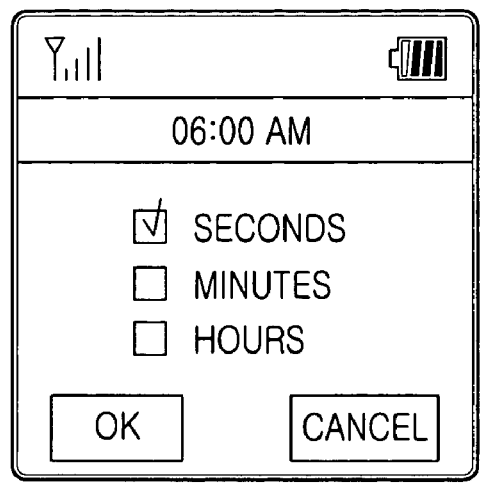
FIGS. 5A to 5F show example screens for setting the unit time used for the progressive alarm function in the mobile communication terminal according to the embodiment of the present invention.
Figure 5B:
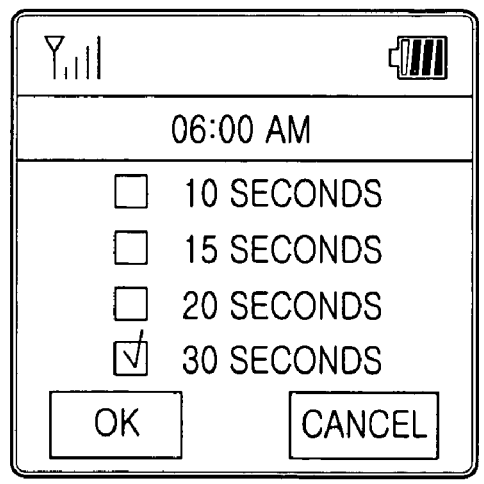

FIG. 5A shows a menu screen for selecting a unit of time for setting the unit time where the user selects a unit of time "Seconds" from three options "Seconds", "Minutes" and "Hours". If an OK key is pressed by the user in the screen of FIG. 5A after "Seconds" is selected as the unit of time for setting the unit time, the mobile communication terminal displays a screen for selecting and setting a unit time for the selected unit of time "Seconds" from among "10 seconds", "15 seconds", "20 seconds" and "30 seconds" as shown in FIG. 5B. The example screen of FIG. 5B shows that the user sets the unit time for the unit of time "Seconds" to "30 seconds".

That is, in the example of FIGS. 5A and 5B, the user of the mobile communication terminal sets the initial alarm time to "6:00 AM" in the screen of FIG. 5A and sets the unit time for the unit of time "Seconds" to "30 seconds" in the screen of FIG. 5B.

Figure 5C:
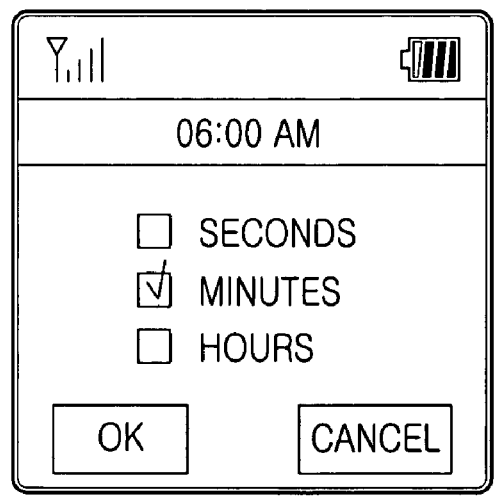
Figure 5D:
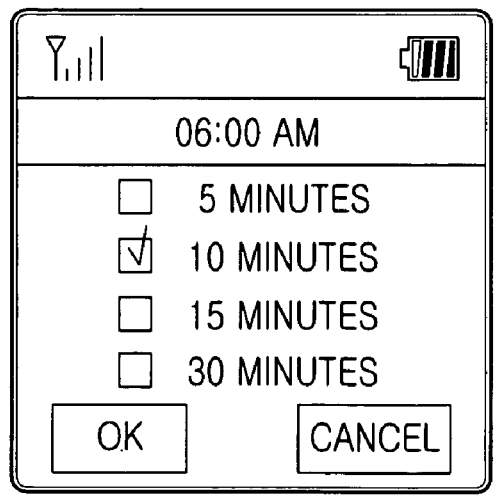

FIG. 5C shows a menu screen for selecting a unit of time for setting the unit time where the user selects a unit of time "Minutes" from three options "Seconds", "Minutes" and "Hours". If an OK key is pressed by the user in the screen of FIG. 5C after "Minutes" is selected as the unit of time for setting the unit time, the mobile communication terminal displays a screen for selecting and setting a unit time for the selected unit of time "Minutes" from among "5 minutes", "10 minutes", "15 minutes" and "30 minutes" as shown in FIG. 5D. The example screen of FIG. 5D shows that the user sets the unit time for the unit of time "Minutes" to "10 minutes". That is, in the example provided at FIGS. 5C and 5D, the user of the mobile communication terminal sets the initial alarm time to "6:00 AM" in the screen of FIG. 5C and sets the unit time for the unit of time "Minutes" to "10 minutes" in the screen of FIG. 5D.

Figure 5E:
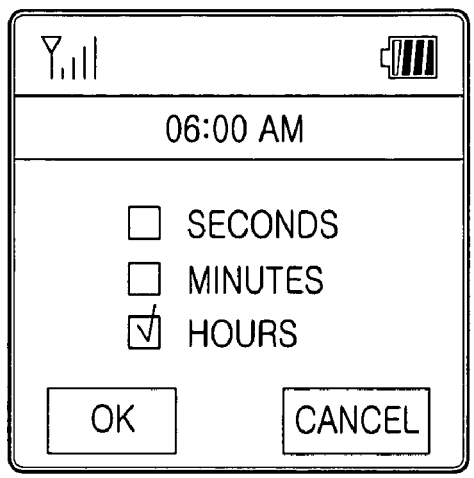
Figure 5F:
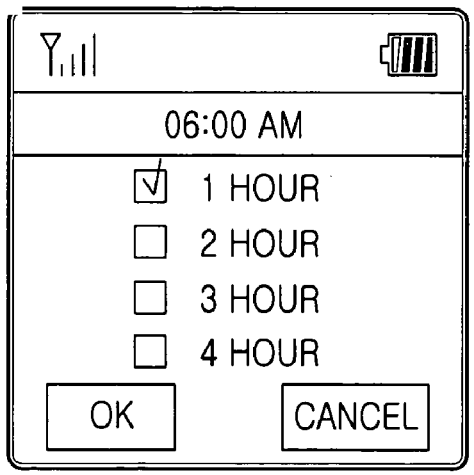

FIG. 5E shows a menu screen for selecting a unit of time for setting the unit time where the user selects a unit of time "Hours" from three options "Seconds", "Minutes" and "Hours". If an OK key is pressed by the user in the screen of FIG. 5E after "Hours" is selected as the unit of time for setting the unit time, the mobile communication terminal displays a screen for selecting and setting a unit time for the selected unit of time "Hours" from among "1 hour", "2 hours", "3 hours" and "4 hours" as shown in FIG. 5F. The example screen of FIG. 5F shows that the user sets the unit time for the unit of time "Hours" to "1 hour". That is, in the example of FIGS. 5E and 5F, the user of the mobile communication terminal sets the initial alarm time to "6:00 AM" in the screen of FIG. 5E and sets the unit time for the unit of time "Hours" to "1 hour" in the screen of FIG. 5F.

Figure 6:
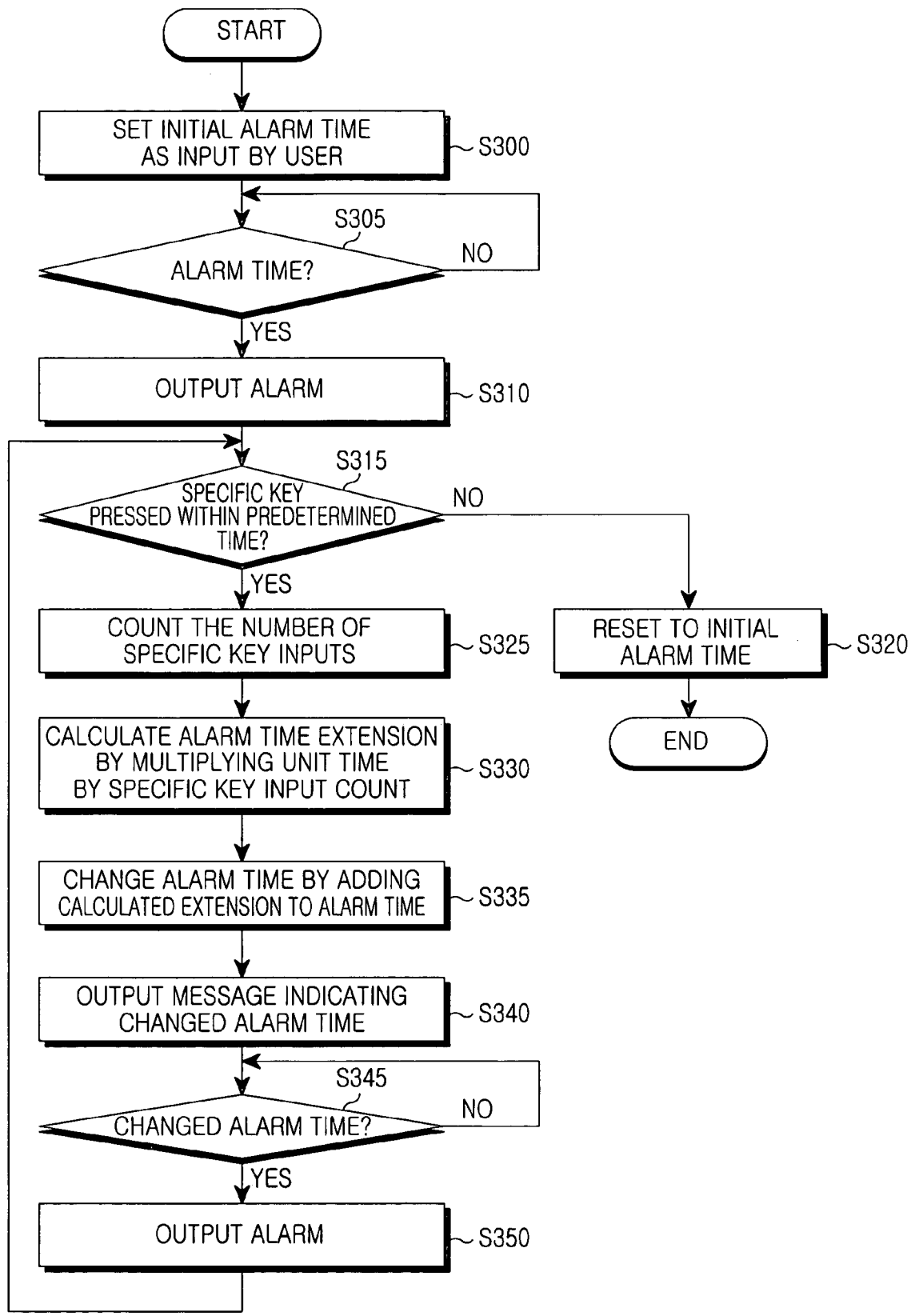
FIG. 6 is a flow chart showing how the mobile communication terminal operates in the progressive alarm mode according to a first embodiment of the present invention.

FIG. 6 is a flow chart showing how the mobile communication terminal operates in the progressive alarm mode according to a first embodiment of the present invention. As shown in FIG. 6, the mobile communication terminal sets an initial alarm time, input by the user in an alarm setting mode, as an alarm time of the terminal at step S300. At step S305, the mobile communication terminal then checks whether the current time reaches the alarm time set at step S300. That is, the mobile communication terminal waits until the initial alarm time at step S305. The mobile communication terminal then outputs at step S310 an alarm at the initial alarm time.

The mobile communication terminal checks at step S315 whether a specific key (for example, a volume key) for setting the progressive alarm time is pressed within a predetermined time after the alarm is output at step S310. The predetermined time is preferably set to 1 or 2 minutes, or can also be optionally set by the user.

If the specific key is pressed within the predetermined time, the mobile communication terminal counts the number of times the specific key is pressed at step S325. This count number is used to obtain an alarm time extension, by which the alarm time is to be extended, by an arithmetic operation thereof with the unit time set when the progressive alarm function is set in the alarm setting mode. That is, the mobile communication terminal multiplies the preset unit time by the number of times the specific key is pressed, counted at step S325, to obtain the alarm time extension at step S330. For example, if the unit time is "5 minutes" and the number of times the specific key is pressed is 2, the alarm time extension is "10 minutes" (i.e. 5 minutes×2).

The mobile communication terminal then changes the initial alarm time by adding the alarm time extension calculated at step S330 to the alarm time at step S335. For example, if the unit time is "5 minutes" and the number of times the specific key is pressed is 2 so that the alarm time extension is "10 minutes" (i.e. 5 minutes×2), and if the initial alarm time is "6:00 AM", the changed alarm time is "6:10 AM" as a result of adding the alarm time extension "10 minutes" to the initial alarm time "6:00 AM". Thereafter, "6:10 AM" will be used as a basis for calculating the next alarm time.

If the alarm time is changed at step S335, the mobile communication terminal outputs a message indicating the changed alarm time at step S340. This message may be a text or voice message, but is preferably a voice message to facilitate the alarm function. If the alarm time is changed from "6:00 AM" to "6:10 AM", the mobile communication terminal outputs a message such as "Alarm time is changed to 6:10 AM".

The mobile communication terminal checks whether the current time reaches the changed alarm time at step S345, and outputs an alarm at the changed alarm time at step S350. Here, the mobile communication terminal may output an alarm sound different from the first alarm sound. After outputting the alarm, the mobile communication terminal returns to step S315 to check whether the specific key is pressed within a predetermined time (for example, 1 or 2 minutes), and repeats the steps described above.

If the specific key is not pressed within the predetermined time while repeating the procedure starting at step S315 (i.e. checking whether the specific key is pressed within the predetermined time) to step S350 (i.e., outputting the alarm at the changed alarm time), the mobile communication terminal resets the alarm time to the initial alarm time set by the user in the alarm setting mode at step S320.

The procedure of FIG. 6 will now be described with reference to the example of FIGS. 5C and 5D.

As shown in FIGS. 5C and 5D, the mobile communication terminal sets the initial alarm time "6:00 AM" as an alarm time of the terminal, and sets the unit time used for the progressive alarm function to "10 minutes". The mobile communication terminal outputs an alarm at 6:00 AM. If the specific key is pressed twice within the predetermined time (for example, within about 1 minute) from 6:00 AM, the mobile communication terminal calculates an alarm time extension "20 minutes" by multiplying the unit time "10 minutes" by the specific key input count "2" (i.e. the alarm time extension=the unit time×the number of times the specific key for setting the progressive alarm time is pressed). The mobile communication terminal then changes the alarm time to "6:20 AM" by adding the calculated alarm time extension "20 minutes" to the initial alarm time "6:00 AM".

The mobile communication terminal again outputs the alarm at 6:20 AM. If the specific key is pressed four times within the predetermined time from 6:20 AM, the mobile communication terminal calculates an alarm time extension "40 minutes" by multiplying the unit time "10 minutes" by the specific key input count "4" and then changes the alarm time to "7:00 AM" by adding the calculated alarm time extension "40 minutes" to the current alarm time "6:20 AM".

The changed alarm time is calculated based on its previous alarm time (i.e. by adding the calculated alarm time extension to the previous alarm time). For example, the first changed alarm time "6:20 AM" is obtained based on its previous alarm time "6:00 AM", and the second changed alarm time "7:00 AM" is obtained based on its previous alarm time "6:20 AM". Here, let us assume that the alarm time has progressed up to "8:30 AM" with the progressive alarm function performed by the mobile communication terminal. Then, the mobile communication terminal outputs an alarm at 8:30 AM, and waits the specific key to be pressed until the predetermined time passes. If the specific key is not pressed within the predetermined time from 8:30 AM, the mobile communication terminal disregards all the changed alarm times and resets the alarm time to the initial alarm time "6:00 AM".

Figure 7:
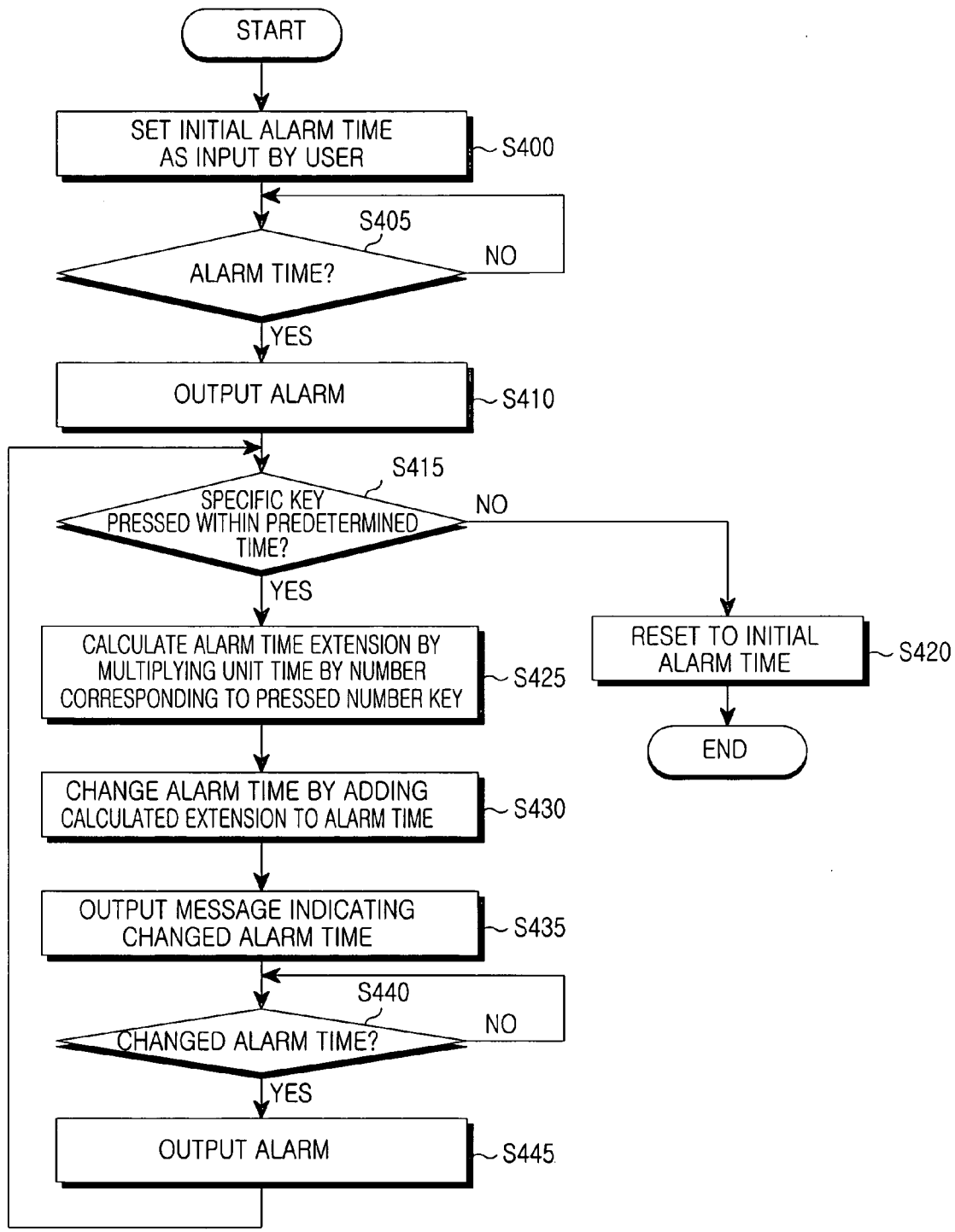
FIG. 7 is a flow chart showing how the mobile communication terminal operates in the progressive alarm mode according to a second embodiment of the present invention.

FIG. 7 is a flow chart showing how the mobile communication terminal operates in the progressive alarm mode according to a second embodiment of the present invention. As shown in FIG. 7, the mobile communication terminal sets an initial alarm time, input by the user in an alarm setting mode, as an alarm time of the terminal at step S400. The mobile communication terminal then checks at step S405 whether the current time reaches the initial alarm time set at step S400. That is, the mobile communication terminal waits until the initial alarm time at step S405. The mobile communication terminal then outputs an alarm at the initial alarm time at step S410.

The mobile communication terminal checks at step S415 whether a number key for setting the progressive alarm time is pressed within a predetermined time after the alarm is output at step S410. The predetermined time is preferably set to 1 or 2 minutes or can also be optionally set by the user.

If the number key is pressed within the predetermined time, the mobile communication terminal calculates an alarm time extension, by which the alarm time is to be extended, by multiplying the preset unit time by a number corresponding to the pressed number key at step S425. For example, if the unit time is "5 minutes" and a number corresponding to the pressed number key is 2, the alarm time extension is "10 minutes" (i.e. 5 minutes×2).

The mobile communication terminal then changes at step S430 the alarm time by adding the alarm time extension calculated at step S425 to the alarm time. For example, if the initial alarm time is "6:00 AM", the changed alarm time is "6:10 AM" as a result of adding the alarm time extension "10 minutes" to the initial alarm time "6:00 AM". Thereafter, "6:10 AM" will be used as a basis for calculating the next alarm time.

If the alarm time is changed at step S430, the mobile communication terminal outputs a message indicating the changed alarm time at step S435. This message may be a text or voice message, but is preferably a voice message to facilitate the alarm function. If the alarm time is changed from "6:00 AM" to "6:10 AM", the mobile communication terminal outputs a message such as "Alarm time is changed to 6:10 AM".

The mobile communication terminal checks at step S440 whether the current time reaches the changed alarm time, and outputs an alarm at the changed alarm time at step S445. After outputting the alarm, the mobile communication terminal returns to step S415 to check whether a number key is pressed within a predetermined time (for example, 1 or 2 minutes), and repeats the steps described above.

If a number key is not pressed within the predetermined time while repeating the procedure starting step S415 (i.e. checking whether a number key is pressed within the predetermined time) to step S445 (i.e., outputting the alarm at the changed alarm time), the mobile communication terminal resets the alarm time to the initial alarm time set by the user in the alarm setting mode at step S420.

As apparent from the above description, the present invention provides a mobile communication terminal and method for providing a progressive alarm function in which the user can optionally control an alarm time of the terminal continually change the alarm time. The progressive alarm function allows the user to continually extend the alarm time by pressing a specific key provided on the mobile communication terminal, without having to go through the trouble of performing the key operations required to change the alarm time in the alarm setting menu.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the above embodiments, but is defined by the accompanying claims as well as equivalents thereof.

What is claimed is:

1. A method for providing a progressive alarm function of a mobile communication terminal, comprising:
   a) switching to an alarm setting mode upon user request;
   b) determining, by a user, an initial alarm time, and inputting, by the user, the determined initial alarm time as the alarm time of the terminal;
   c) determining, by the user, a unit time for changing and extending the alarm time, and inputting, by the user, the determined unit time;
   d) outputting an alarm at the initial alarm time and checking whether a number key is selected within a predetermined time; and
   e) changing the alarm time by adding to the alarm time the unit time, multiplied by the number of the selected number key of a keypad of the mobile communication terminal, including a plurality of number keys.

2. The method according to claim 1, wherein after the alarm time is changed, repeating the outputting step.

3. The method according to claim 1, further comprising resetting the alarm time to the initial alarm time if the number key is not resetting the alarm time to the initial alarm time if the number key is not selected within the predetermined time.

4. The method according to claim 3, wherein step e) further includes outputting a message indicating the changed alarm time when the alarm time is changed based on the number corresponding to the selected number.

5. The method according to claim 1, wherein step e) further includes outputting a message indicating the changed alarm time when the alarm time is changed based on the number corresponding to the selected number key.

6. A mobile communication terminal comprising:
a controller for setting an initial alarm time determined by and input by a user of the terminal as an alarm time of the terminal, setting a unit time determined by and input by the user to the controller for changing and extending the alarm time, and then performing a progressive alarm function for continually changing the alarm time from the initial alarm time based on the unit time;
a progressive alarm information storage unit for storing information of an initial alarm time input to the controller, an alarm time changed according to selection of a number key, and a unit time input to the controller for changing the alarm time;
the controller for changing the alarm time by adding to the alarm time the unit time, multiplied by the number of the selected number key of a keypad of the mobile communication terminal including a plurality of number keys; and
an alarm output unit for outputting an alarm at an alarm time according to the information stored in the progressive alarm time storage unit.

7. The terminal according to claim 6, wherein, if the number key is selected within a predetermined time from output of the alarm at the alarm time set by the controller, the controller changes the alarm time.

8. The terminal according to claim 7, wherein, if the alarm time is changed, the controller outputs a message indicating the changed alarm time.

9. The terminal according to claim 6, wherein the controller resets the alarm time to the initial alarm time if, after the alarm time is changed, the number key is not selected within a predetermined time from the changed alarm time.

10. A method for providing a progressive alarm function of a mobile communication terminal, comprising:
a) switching to an alarm setting mode upon user request;
b) determining, by a user, an initial alarm time, and inputting, by the user, the determined initial alarm time as the alarm time of the terminal;
c) determining, by the user, a unit time that can be selectively set for changing and extending the alarm time, and inputting, by the user, the determined unit time;
d) outputting an alarm time at the initial alarm time and checking whether a number key is selected within a predetermined time; and
e) changing the alarm time by adding to the alarm time the unit time, multiplied by the number of the selected number key of a keypad of the mobile communication terminal including a plurality of number keys.

* * * * *